United States Patent [19]
Szum et al.

[11] Patent Number: 5,837,750
[45] Date of Patent: Nov. 17, 1998

[54] RADIATION CURABLE OPTICAL FIBER COATING COMPOSITION

[75] Inventors: David M. Szum, Elmhurst; Timothy E. Bishop, Algonquin; Steven R. Schmid, Long Grove, all of Ill.

[73] Assignee: DSM N.V., Heerlen, Netherlands

[21] Appl. No.: 615,857

[22] Filed: Mar. 12, 1996

Related U.S. Application Data

[63] Continuation-in-part of Ser. No. 403,521, Mar. 13, 1995, abandoned.

[51] Int. Cl.⁶ .............................. C08F 2/48; C08L 63/10; C08L 75/08; C08L 75/16
[52] U.S. Cl. .................... 522/81; 522/92; 522/96; 522/97; 522/64; 528/65; 528/363; 528/366; 428/378; 385/145
[58] Field of Search ................... 522/96, 97, 64, 522/87, 92; 428/378; 385/145; 528/65, 363, 366

[56] References Cited

U.S. PATENT DOCUMENTS

| | | | |
|---|---|---|---|
| 4,904,051 | 2/1990 | Broer et al. | 350/96.3 |
| 5,093,386 | 3/1992 | Bishop et al. | 522/96 |
| 5,219,896 | 6/1993 | Coady et al. | 522/97 |
| 5,246,531 | 9/1993 | Shustack | 385/128 |

FOREIGN PATENT DOCUMENTS 9013579  11/1990  WIPO .

Primary Examiner—Susan W. Berman
Attorney, Agent, or Firm—Pillsbury Madison & Sutro

[57] ABSTRACT

Provided is a radiation-curable, glass optical fiber coating composition which when suitably cured exhibits resistance to attack from hydrocarbon gel cable filing material. The composition contains

- about 10 to about 90% by weight of a first radiation-curable oligomer;
- from 0 to about 40% by weight of a reactive diluent;
- from 0 to about 40% by weight of a photoinitiator;
- from 0 to about 10% by weight of a pigment; and
- about 10 to about 90% by weight of a second radiation-curable oligomer according to the following formula:

$$R^1\text{-}L^1\text{-}C^1\text{-}L^2\text{-}R^2 \qquad (1)$$

where:

$R^1$ and $R^2$, independently, each represent a radiation-curable functional group;

$L^1$ and $L^2$, independently, each represent an alkyleneoxy chain having from about 2 to about 40 carbon atoms, wherein $L^1$ and $L^2$ are linked to $C^1$ through an oxygen atom $C^1$ comprises a hydrocarbon having from about 5 to about 40 carbon atoms and containing at least one cyclic group.

18 Claims, No Drawings

RADIATION CURABLE OPTICAL FIBER COATING COMPOSITION

This application is a continuation-in-part of U.S. patent application Ser. No. 08/403,521, filed on Mar. 13, 1995, now abandoned, which is incorporated herein by reference.

BACKGROUND OF THE INVENTION

1. Field of the Invention

This invention relates to a radiation curable optical fiber coating composition which after curing results in a coating having enhanced resistance to moisture and hydrocarbon gel. The invention further relates to a pigmented radiation curable coating composition suitable for use as an outer primary coating for optical fibers.

2. Description of Related Art

Optical fibers are frequently coated with two superposed radiation curable coatings, which together form a primary coating. The coating which contacts the glass is called the inner primary coating and the overlaying coating is called the outer primary coating. In older references, the inner primary coating was called the primary coating and outer primary coating was called the secondary coating, but for reasons of clarity, that terminology was abandoned by the industry in recent years.

The inner primary coating is usually a soft coating providing resistance to microbending. Microbending can lead to attenuation of the signal transmission capability of the coated fiber and is therefore undesirable. The outer primary coating, which is exposed, is typically a harder coating providing desired resistance to handling forces, such as those encountered when the fiber is cabled.

The coating compositions for the inner and outer primary coating generally comprise a polyethylenically unsaturated oligomer in a liquid ethylenically unsaturated medium.

Usually the optical fibers are glass fibers. Optical glass fibers are weakened upon exposure to water. For example, moisture in air can cause weakening and the eventual breakage of glass fibers. It is therefore desirable that the inner and outer primary coating prevent moisture from attacking the glass substrate. However, many conventional coating compositions have a peak water absorption greater than 1.7% and therefore are not effective in protecting the glass substrate from moisture.

In addition to causing the weakening of glass substrates, moisture can also cause the coating layers to delaminate from each other and/or the glass surface. The delamination of the inner primary coating can result in a weakened glass substrate, because the inner primary coating can no longer protect the glass from attack from moisture.

To avoid moisture damage to the glass surface, it is desirable to provide a coating composition having low water absorption, resistance to delamination from glass, and a low water soak extraction. Moreover a coating composition for optical glass fibers preferably should also provide a cured coating having sufficient adhesion to the glass fiber and yet be strippable for field applications.

For certain applications, conventional coating compositions do not provide cured outer primary coatings having the required combination of sufficient adhesion to the inner primary coating, strippability, resistance to water absorption, and a low water soak extraction.

Furthermore, it is frequently desired to color an outer primary coating to facilitate the selection of the optical fiber which is desired from among many glass fibers in a cable assembly. Published European Patent Application No. 418829 discloses the use of radiation curable ink or a colored solvent borne lacquer to color or overcoat an optical fiber which has already been coated with an inner and outer primary coating. This requires a third coating operation which is undesirable.

It has been proposed to include sufficient pigment for desired coloration directly into the outer primary coating. Such a pigmented outer primary coating is disclosed in published PCT application WO 90/13579, which describes an outer primary coating composition containing pigment particles having a size of less than about 1 micron.

Published Japanese patent application No. 64-22975 describes an ink composition comprising a UV-curable resin and a ethoxylated bisphenol-A-diacrylate. This reference does not disclose using the composition as an outer primary coating nor how to improve the moisture resistance of an outer primary coating. Moreover, the composition disclosed in JP-A-64-22975 is not suitable as an outer primary coating because, when cured, the coating does not have the required toughness to protect the optical glass fiber during handling.

Conventional pigmented outer primary coating compositions, when cured, have insufficient resistance to moisture. When the conventional cured pigmented coating is exposed to water, dimensional changes occur. These dimensional changes can lead to attenuation of the signal transmission capability of the glass optical fiber. Therefore, there is still a need for a coating composition suitable for use as an outer primary coating, which can be pigmented, and which provides a cured coating having low water absorption, a low water soak extraction, and resistance to attack from hydrocarbon gel cable filling material.

SUMMARY OF THE INVENTION

It is an object of the invention to provide a coating composition suitable for use as an outer primary coating which can be pigmented. Another object of the invention is to provide an outer primary coating composition that when cured exhibits a low water absorption, a low water soak extraction, and resistance to attack from hydrocarbon gel cable filling material.

The above object and other objects are obtained by providing a radiation-curable, glass optical fiber coating composition which when suitably cured exhibits resistance to attack from hydrocarbon gel cable filing material. The uncured composition comprises:

A. about 10 to about 90% by weight of a radiation-curable oligomer;
C. from 0 to about 40% by weight of a reactive diluent;
D. from 0 to about 40% by weight of a photoinitiator;
E. from 0 to about 10% by weight of a pigment; and
B. about 10 to about 90% by weight of a second radiation-curable oligomer according to the following formula:

$$R^1\text{-}L^1\text{-}C^1\text{-}L^2\text{-}R^2 \qquad (1)$$

where:
$R^1$ and $R^2$, independently, each represent a radiation-curable functional group;
$L^1$ and $L^2$, independently, each represent an alkyleneoxy chain having from about 2 to about 40 carbon atoms, wherein $L^1$ and $L^2$ are linked to $C^1$ through an oxygen atom;
$C^1$ comprises a hydrocarbon having from about 5 to about 40 carbon atoms and containing at least one cyclic group. The weight percentages are relative to the total weight of components A. through E.

The composition, when cured, results in coatings having improved water resistance. When exposed to moisture, the coated glass optical fiber swells less than conventional fibers, providing enhanced concentricity of the coated glass optical fibers. Enhanced concentricity of coated optical fibers results in greater tolerances in the production process and increased yields. Furthermore, swelling of the coating can cause undesired microbending of glass optical fiber.

This invention also relates to an optical glass fiber coated with an inner primary coating and the above outer primary coating. The outer primary coatings according to the invention exhibit good color permanence.

This invention also provides a coated glass optical fiber coated with a coating having a room temperature tensile modulus of at least about 50 MPa, an elongation at break of at least about 3%, a glass transition temperature Tg (tan delta max) of at least about 25° C., and a peak water absorption of no more than 1.7. The coating comprises a suitably radiation-cured, glass optical fiber coating composition. The coating composition in uncured form comprises a radiation-curable coating composition comprising a radiation-curable oligomer according to the following formula:

$$R^1\text{-}L^1\text{-}C^1\text{-}L^2\text{-}R^2 \qquad (1)$$

where:

$R^1$ and $R^2$, independently, each represent a radiation-curable functional group;

$L^1$ and $L^2$, independently, each represent an alkyleneoxy chain having from about 2 to about 40 carbon atoms, wherein $L^1$ and $L^2$ are linked to $C^1$ through an oxygen atom;

$C^1$ comprises a hydrocarbon having from about 5 to about 40 carbon atoms and containing at least one cyclic group.

DETAILED DESCRIPTION OF THE INVENTION

The cured outer primary coating, made by curing the above coating composition, has a room temperature tensile modulus of at least about 50 MPa, an elongation at break of at least about 3%, a Tg (tan delta max) of at least about 25° C., and a peak water absorption of no more than 1.7, as defined herein. Preferably, an outer primary coating, made by curing the coating composition, has a room temperature tensile modulus of at least about 400 MPa, an elongation at break of at least about 5%, a Tg of at least about 40° C., and a peak water absorption of no more than about 1.5. The outer primary coatings according to the invention have a good color permanence.

The radiation-curable oligomer A. can be any radiation-curable oligomer used in radiation-curable, glass optical fiber coating compositions. One skilled in the art knows how to select and use radiation-curable oligomers in order to achieve the desired properties. An example of a suitable radiation-curable oligomer A. includes an urethane oligomer having a molecular weight of at least about 500 and containing at least one ethylenically unsaturated group that can be polymerized through actinic radiation. Preferably, the oligomer A. has two terminal radiation-curable functional groups, one at each end of the oligomer.

Preferably, the molecular weight of the oligomer A. is at least about 700 and at most about 10,000 Daltons. More preferably the molecular weight is between about 1000 and about 5000, and most preferably, between about 2000 and 4000 Daltons. Molecular weight, as used throughout this application, is the calculated molecular weight of the molecule concerned. In the case of a polymer structure, it is the calculated average molecular weight of the expected structure based on the starting materials and the reaction conditions. The molecular weight can also be determined using conventional techniques.

Preferably, the oligomer A. is substantially free of isocyanate functionality.

The radiation-curable oligomer A. is preferably present in an amount of about 20 to about 40% by weight, and more preferably about 25 to about 35% by weight. All weight percentages used herein are expressed as percentages relative to the total weight of components A. through E. present in the composition.

Examples of suitable radiation-curable functional groups which can be present on the oligomer A. include ethylenically unsaturated groups having (meth)acrylate, vinylether, acrylamide, maleate or fumarate functionality. The language "(meth)acrylate" as used herein, means methacrylate, acrylate, or mixtures thereof.

Preferably, the radiation-curable group in the oligomer A. is an (meth)acrylate or vinylether group. Most preferably, the radiation-curable group is an acrylate group.

Another type of radiation-curable functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

Preferably, the oligomer A. contains at least two ethylenically unsaturated groups which are bound to an oligomer backbone. For example, ethylenically unsaturated groups can be present at each end of the oligomer backbone as reactive termini. The oligomer backbone can have a molecular weight of at least about 200, and can be, for example, based on a polyether, polyolefin, polyester, polycarbonate, or copolymers thereof. Preferably, the oligomer backbone is a polyether. The molecular weight of the oligomer backbone is preferably at least about 250, more preferably at least about 400, and most preferably at least about 600. The molecular weight is preferably not more than about 10,000, more preferably not more than about 5,000, and most preferably not more than about 3000.

The oligomer backbone can comprise one or more polymer blocks coupled with each other via, for example, urethane linkages.

Preferably, the backbone-oligomer is a polyether, a polyolefin, a polyester, a polycarbonate, or copolymers thereof. If the oligomer backbone is a polyether, the resulting coatings have a low glass transition temperature and good mechanical properties. If the oligomer backbone is a polyolefin, the resulting coatings have a further improved water resistance.

Oligomer A. can be, for example, prepared by reaction of (i) an oligomer polyol, (ii) a diisocyanate and (iii) a hydroxy functional ethylenically unsaturated monomer, for example hydroxyalkyl(meth)acrylate.

If a oligomer backbone polyol is used, preferably it has on average at least about 2 hydroxyl groups. The oligomer backbone polyol may have, on average, more than 2 hydroxyl groups. Examples of such an oligomer diol include polyether diols, polyolefin diols, polyester diols, polycarbonate diols, and mixtures thereof. Polyether and polyolefin diols, or combinations thereof, are preferred.

If a polyether diol is used, preferably the polyether is a substantially non-crystalline polyether. Preferably, the polyether comprises repeating units of one or more of the following monomer groups:

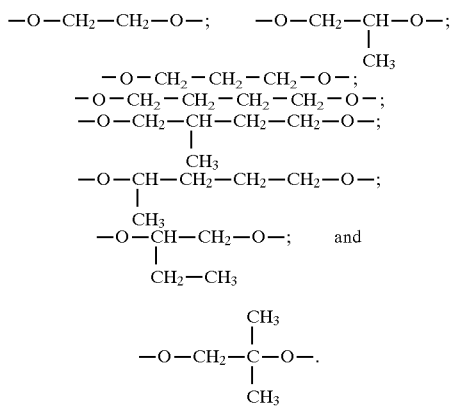

Hence, the polyether can be made from epoxy-ethane, epoxy-propane, tetrahydrofuran, methyl-substituted tetrahydrofuran, epoxybutane, and the like.

An example of a polyether polyol that can be used is the polymerization product of 20 percent by weight of 3-methyltetrahydrofuran and 80 percent by weight of tetrahydrofuran, both of which have undergone a ring opening polymerization. This polyether copolymer contains both branched and non-branched oxyalkylene repeating units and is marketed as PTG-L 1000 (Hodogaya Chemical Company of Japan). Another example of a polyether that can be used is PTG-L 2000 (Hodogaya Chemical Company).

If a polyolefin diol is used, the polyolefin is preferably a linear or branched hydrocarbon containing a plurality of hydroxyl end groups. Preferably, the hydrocarbon is a non-aromatic compound containing a majority of methylene groups (—CH$_2$—) and which can contain internal unsaturation and/or pendent unsaturation. Fully saturated, for example, hydrogenated hydrocarbons, are preferred because the long term stability of the cured optical fiber coating increases as the degree of unsaturation decreases. Examples of hydrocarbon diols include, for example, hydroxyl-terminated, fully or partially hydrogenated 1,2-polybutadiene; 1,4- 1,2-polybutadiene copolymers, 1,2-polybutadiene-ethylene or -propylene copolymers, polyisobutylene polyol; mixtures thereof, and the like. Preferably, the hydrocarbon diol is a substantially, fully hydrogenated 1,2-polybutadiene or 1,2-polybutadiene-ethene copolymer.

Examples of polycarbonate diols are those conventionally produced by the alcoholysis of diethylene carbonate with a diol. The diol can be, for example, an alkylene diol having about 2 to about 12 carbon atoms, such as, 1,4-butane diol, 1,6-hexane diol, 1,12-dodecane diol, and the like. Mixtures of these diols can also be utilized. The polycarbonate diol can contain ether linkages in the backbone in addition to carbonate groups. Thus, for example, polycarbonate copolymers of alkylene oxide monomers and the previously described alkylene diols can be used. Alkylene oxide monomers include, for example, ethylene oxide, tetrahydrofuran, and the like. These copolymers produce cured coatings that exhibit a lower modulus and also inhibit crystallinity of the liquid coating composition compared to polycarbonate diol homopolymers. Admixtures of the polycarbonate diols and polycarbonate copolymers can also be utilized.

Polycarbonate diols include, for example, Duracarb 122 (PPG Industries) and Permanol KM10-1733 (Permuthane, Inc., Ma.). Duracarb 122 is produced by the alcoholysis of diethylcarbonate with hexane diol.

Examples of polyester diols include the reaction products of saturated polycarboxylic acids, or their anhydrides, and diols. Saturated polycarboxylic acids and anhydrides include, for example, phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid, the like, anhydrides thereof and mixtures thereof. Diols include, for example, 1,4-butanediol, 1,8-octane diol, diethylene glycol, 1,6-hexane diol, dimethylol cyclohexane, and the like. Included in this classification are the polycaprolactones, commercially available from Union Carbide under the trade designation Tone Polyol series of products, for example, Tone 0200, 0221, 0301, 0310, 2201, and 2221. Tone Polyol 0301 and 0310 are trifunctional.

Any organic polyisocyanate (ii), alone or in admixture, can be used as the polyisocyanate.

Thereby, a product is obtained which is end-capped with the reaction product from the isocyanate/ethylenically unsaturated monomer reaction on at least one end of the molecule. "End-capped" means that a functional group caps one of the two ends of the oligomer diol.

The isocyanate/hydroxy functional monomer reaction product attaches to the oligomer backbone (i) diol via a urethane linkage. The urethane reactions can take place in the presence of a catalyst. Catalysts for the urethane reaction include, for example, diazabicyclooctane crystals and the like.

Preferably the polyisocyanate (ii) is a diisocyanate. Examples of diisocyanates (ii) include isophorone diisocyanate (IPDI), toluene diisocyanate (TDI), diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI and polyethylene adipate terminated with TDI, respectively. Preferably, the isocyanates are TDI and IPDI.

Generally the compound providing a reactive terminus (iii) contains a functional group which can polymerize under the influence of actinic radiation, and the compound contains a functional group which can react with the diisocyanate. Hydroxy functional ethylenically unsaturated monomers are preferred. More preferably, the hydroxy functional ethylenically unsaturated monomer contains acrylate, (meth)acrylate, vinyl ether, maleate or fumarate functionality.

In the reaction between hydroxy group of (i) and isocyanate groups of (ii), it is preferred to employ a stoichiometric balance between hydroxy and isocyanate functionality and to maintain the reaction temperature of at least 25° C. The hydroxy functionality should be substantially consumed.

The mole ratio of the isocyanate to the hydroxy functional ethylenically unsaturated monomer is about 3:1 to 1.2:1, preferably about 2:1 to 1.5:1. The hydroxy functional ethylenically unsaturated monomer attaches to the isocyanate via an urethane linkage. Monomers having (meth)acrylate functional groups include, for example, hydroxy functional acrylates such as 2-hydroxyethyl acrylate, 2-hydroxypropyl acrylate, and the like. Monomers having vinyl ether functional groups include, for example, 4-hydroxybutyl vinyl ether, and triethylene glycol monovinyl ether. Monomers having maleate functional groups include, for example, maleic acid and hydroxy functional maleates.

Component B. is a radiation-curable oligomer according to the following formula:

$$R^1\text{-}L^1\text{-}C^1\text{-}L^2\text{-}R^2 \tag{1}$$

where:
- $R^1$ and $R^2$, independently, each represent a radiation-curable functional group;
- $L^1$ and $L^2$, independently, each represent an alkyleneoxy chain having from about 2 to about 40 carbon atoms, wherein $L^1$ and $L^2$ are linked to $C^1$ through an oxygen atom;
- $C^1$ comprises a hydrocarbon having from about 5 to about 40 carbon atoms and containing at least one cyclic group.

Radiation-curable functional groups are well known and within the skill of the art. Based on the disclosure provided herein, one skilled in the art will know what radiation-curable functional groups to use as $R^1$ and $R^2$, to provide the desired curing properties.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, or styrene functionality.

Another type of functionality generally used is provided by, for example, epoxy groups, or thiol-ene or amine-ene systems. Epoxy groups in can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

The groups $L^1$ and $L^2$ are each alkyleneoxy chains having from about 2 to about 40 carbon atoms, preferably about 2 to about 20 carbon atoms, and most preferably about 2 to about 10 carbon atoms. The groups $L^1$ and $L^2$ each comprise about 1 to about 12 alkylether groups, and preferably, from about 1 to about 6 alkylether groups. Examples of suitable alkylether groups include ethylether, propylether and butylether. The alkylether groups can also contain cyclic groups. Preferably, the alkylether group is made from an epoxy containing alkane, such a epoxyethane, epoxypropane, and epoxybutane.

The groups $L^1$ and $L^2$ connect to $C^1$ through an oxygen atom. The oxygen connecting the group $L^1$ to the group $C^1$ is considered part of the group $L^1$ and the oxygen connecting the group $L^2$ to the group $C^1$ is considered part of the group $L^2$.

The group $C^1$ comprises about 5 to about 40 carbon atoms and contains at least one cyclic group. Preferably, the group $C^1$ comprises about 5 to about 20 carbon atoms.

The cyclic groups can be saturated or fully or partially unsaturated cyclic alkylene groups. Examples of suitable saturated cyclic alkylene groups include, but are not limited to, cyclopentane, cyclohexane, cycloheptane, and cyclooctane. Cylcopentane and cyclohexane are preferred. The cyclic alkylene groups can also be partially unsaturated such as cyclobutene, cyclopentene, cyclohexene, cycloheptene, and cyclooctene. Cyclopentene and cyclohexene are preferred. Further examples of suitable cyclic alkylene groups include arylenes, such as benzene and naphthalene. Preferably, the cyclic group is benzene.

The cyclic groups can be substituted with hydrocarbon groups, such as methyl, ethyl, propyl, and butyl groups.

Preferably, the group $C^1$ comprises at least two cyclic groups which are either directly connected or connected via one or more hydrocarbon groups. Examples of such preferred groups $C^1$ are represented by the following formulae (2) or (3):

$$X^1\text{-}X^2 \tag{2}$$

$$X^1\text{-}Y^1\text{-}X^2 \tag{3}$$

Where:
- $X^1$ and $X^2$ are each cyclic alkylene groups as described herein; and
- $Y^1$ is a hydrocarbon having from about 1 to about 15 carbon atoms, preferably about 1 to about 10 carbon atoms.

Preferably $X^1$ and $X^2$ are arylenes.

The $Y^1$ group can be saturated or unsaturated, and branched or linear. Examples of suitable saturated $Y^1$ groups include, methyl, ethyl, propyl, and butyl.

Specific examples of suitable groups $C^1$ are derived from bisphenol A, saturated bisphenol A, bisphenol F, saturated bisphenol F, tricyclodecane dimethanol or cyclohexane dimethanol.

An example of a suitable Component B. is an alkoxylated bisphenol di(meth)acrylate. The alkoxylated bisphenol di(meth)acrylate can be any alkoxylated bisphenol di(meth) acrylate and can be prepared in any known manner. Preferably, Component B. is an alkoxylated bisphenol-A-diacrylate.

Preferably the alkoxylated bisphenol-A-di(meth)acrylate is an ethoxylated or propoxylated bisphenol-A-diacrylate. An example of a particularly suitable alkoxylated bisphenol-A-diacrylate is ethoxylated bisphenol-A-diacrylate, commercially available as SR 349A Monomer, supplied by Sartomer.

The alkoxylated bisphenol-A-di(meth)acrylate B. is preferably present in an amount of about 10 to about 80% by weight, more preferably about 40 to about 80% by weight, and most preferably about 50 to about 70% by weight.

The composition according to the invention may comprise a reactive diluent as Component C. The reactive diluent can be used to adjust the viscosity of the coating composition. Thus, the reactive diluent can be a low viscosity monomer containing at least one functional group capable of polymerization when exposed to actinic radiation.

The reactive diluent is preferably added in such an amount that the viscosity of the coating composition is in the range of about 1,000 to about 10,000 mpas. Suitable amounts of the reactive diluent have been found to be about 1 to about 20% by weight, and more preferably about 5 to about 15% by weight.

The reactive diluent preferably has a molecular weight of not more than about 550 or a viscosity at room temperature of not more than about 300 mPa.s (measured as 100% diluent).

The radiation-curable functional group present on the reactive diluent may be of the same nature as that used in the radiation-curable oligomer A. or Component B. Preferably, the radiation-curable functional group present in the reactive diluent is capable of copolymerizing with the radiation-curable functional group present on the radiation-curable oligomer A or Component B.

Preferably, reactive diluent C. comprises a monomer or monomers having an acrylate or vinyl ether functionality and an $C_4$-$C_{20}$ alkyl or polyether moiety. Examples of such reactive diluents are
hexylacrylate,
2-ethylhexylacrylate,
isobornylacrylate,
decylacrylate,
laurylacrylate,
stearylacrylate,
ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone and the like.
This type of reactive diluent preferably is present in an amount between about 1 and about 35 wt. %.

Another preferred type of reactive diluent is a compound comprising an aromatic group. Examples of diluents having an aromatic group include: ethyleneglycolphenyletheracrylate, polyethyleneglycolphenyletheracrylate, polypropyleneglycolphenyletheracrylate, and alkyl-substituted phenyl derivatives of the above monomers, such as polyethyleneglycolnonylphenyletheracrylate. This type of reactive diluent preferably is present in an amount between about 1 and about 35 wt. %.

Furthermore, reactive diluent C. preferably contains two groups capable of polymerization using actinic radiation. A diluent having three or more of such reactive groups can be present as well.
Examples of such monomers include:
$C_2$-$C_{18}$ hydrocarbondioldiacrylates,
$C_4$-$C^{18}$ hydrocarbondivinylethers,
$C_3$-$C_{18}$ hydrocarbontrioltriacrylates,
the polyether analogues thereof, and the like, such as
1,6-hexanedioldiacrylate,
trimethylolpropanetriacrylate,
hexanedioldivinylether,
triethyleneglycoldiacrylate,
pentaeritritoltriacrylate, and
tripropyleneglycol diacrylate.
Preferably the reactive diluent is an alkoxylated alkyl phenol (meth)acrylate, most preferably an ethoxylated nonyl phenol (meth)acrylate.

If the radiation-curable functional group of the radiation-curable oligomer A. or Component B. is an epoxy group, for example, one or more of the following compounds can be used as the reactive diluent:
epoxy-cyclohexane,
phenylepoxyethane,
1,2-epoxy-4-vinylcyclohexane,
glycidylacrylate,
1,2-epoxy-4-epoxyethyl-cyclohexane,
the diglycidylether of polyethylene-glycol,
the diglycidylether of bisphenol-A, and the like.

If the radiation-curable functional group of the radiation-curable oligomer A. or Component B. has an amine-ene or thiol-ene system, examples of reactive diluents having allylic unsaturation that can be used include:
diallylphthalate,
triallyltri-mellitate,
triallylcyanurate,
triallylisocyanurate, and
diallylisophthalate.

For amine-ene systems, amine functional diluents that can be used include, for example:
the adduct of trimethylolpropane,
isophorondiisocyanate and
di(m)ethylethanolamine,
the adduct of hexanediol, isophorondiisocyanate and dipropylethanolamine, and
the adduct of trimethylol propane, trimethylhexamethylenediisocyanate and di(m)ethylethanolamine.

Preferably, the oligomer A., the oligomer B. and the reactive diluent C. (if present) each contain an acrylate group as a radiation-curable group. More preferably, $R^1$ and $R^2$ are both acrylate groups, the ethylenic unsaturation on said oligomer A. is provided by acrylate groups, and the reactive diluent C. (if present) contains an acrylate group.

The photoinitiator, Component D., is useful when conducting an ultraviolet radiation-cure. In other embodiments, for example, when using an electron beam cure of a free radical system, the photoinitiator D. can be omitted. In cationally cured systems, however, a photoinitiator D. is useful even when performing an electron beam cure.

The photoinitiator D., when used in an effective amount to promote radiation cure, preferably provides reasonable cure speed without causing premature gelling of the composition. The cure speed desired will depend on the application of the coating and a skilled artisan will easily be able to adjust the amount and type of photoinitiator to obtain the desired cure speed. The type of photoinitiator which is used will be dependent on whether a free radical-type system or a cationic cure type-system is used.

Examples of free radical-type photoinitiators include, but are not limited to, the following:
hydroxycyclohexylphenylketone;
hydroxymethylphenylpropanone;
dimethoxyphenylacetophenone;
2-methyl-1-[4-(methyl thio) -phenyl]-2-morpholino-propanone-1;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)-ketone;
diethoxyphenyl acetophenone;
2,4,6 trimethylbenzoyl diphenylphosphone;
a mixture of (2,6-dimethoxy benzoyl)-2,4,4 trimethylpentylphosphineoxide and 2-hydroxy-2-methyl-1-phenyl-propan-1-one; and
mixtures of these.

Examples of cationic cure-type photoinitiators include, but are not limited to, onium salts such as iodonium, sulfonium, arsonium, azonium, bromonium, or selenonium. The onium salts are preferably chemically modified to render them more hydrophobic, for example, by incorporating saturated hydrocarbon moieties such as alkyl or alkoxy substituents of from about 4 to about 18 carbon atoms.

Preferred cationic cure initiators include:
(4-octyloxyphenyl) phenyl iodonium hexafluoro antimonate;
(4-octyloxyphenyl) diphenyl sulfonium hexafluoro antimonate;
(4-decyloxyphenyl) phenyl iodonium hexafluoro antimonate; and
(4-octadecyloxyphenyl) phenyl iodonium hexafluoro antimonate.

When a pigment E. is present in the composition according to the invention, it is preferred to use as component D. an acyl phosphine oxide photoinitiator, more specifically a benzoyl diaryl phosphine oxide photoinitiator. Such a photoinitiator provides a high cure speed even in the presence of relatively high amounts of pigment. Published PCT application WO 90/13579 discloses coating compositions containing pigments. Examples of suitable benzoyl diaryl phosphine oxide photoinitiators include:
2,4,6-trimethylbenzoyldiphenyl-phosphine oxide (Lucirin TPO by BASF), and
bis(2,6-dimethoxybenzoyl)-2,4,4-trimethylpentyl-phosphine oxide (Irgacine 1700 by Ciba Geigy).

For an optimum cure speed in the presence of pigment, it is advantageous to combine an acyl phosphine oxide photoinitiator with one or more other photoinitiators, such as hydroxy-cyclohexylphenylketone.

The photoinitiator is preferably present in an amount of about 1 to about 20% by weight, more preferably in an amount of about 1 to about 10% by weight, and most preferably, about 1 to about 5% by weight.

The pigment E. can be any pigment suitable for use in pigmented colored optical fiber coatings. Preferably, the pigment E. is in the form of small particles and is capable of withstanding UV-radiation. Examples of suitable pigments include:
titanium dioxide white (Dupont R-960),
carbon black (Degussa Special 4A or Columbian Raven 420),
lamp black (General carbon LB#6),
phtalo blue G (Sun 249-1282),
phtalo blue R (Cookson BT698D),
phtalo green B (Sun 264-0238),
phtalo green Y (Mobay G5420),
light chrome yellow (Cookson Y934D),
diarylide yellow (Sun 274-3954),
organic yellow (Hoechst H4G),
medium chrome yellow (Cookson Y969D),
yellow oxide (Pfizer YL02288D),
lead free-yellow (BASF Paliotol 1770),
raw umber (Hoover 195),
burnt umber (Lansco 3240X),
lead free orange (Hoechst RL70),
red oxide (Pfizer R2998D),
moly orange (Cookson YL988D),
arylide red (Hoechst F5RKA),
quinacridone red (Ciba RT759D), and
quinacridone violet (Ciba RT887D).

Preferably, the pigment has a mean particle size of not more than about 1 $\mu$m. The particle size of the commercial pigments can be lowered by milling if necessary. The pigment is preferably present in an amount of about 1 to about 10% by weight, and more preferably in an amount of about 3 to about 8% by weight.

Other components that can be present in the composition include, but are not limited to, light sensitive and light absorbing components, catalysts, initiators, lubricants, wetting agents, organofunctional silanes, antioxidants, and stabilizers, which do not interfere with the desired resistance to moisture. These additives may be added to the compositions according to the invention in an amount that is usual for the additive when used in optical fiber coatings.

The examples of polymeric coating compositions set forth above are intended only to be illustrative of the coating compositions that may be employed in the present invention. The compositions according to the invention can be applied on an optical fiber using conventional coating technology.

In producing a coated optical fiber, a liquid coating composition is applied to a substrate and subsequently cured. Typically, the cure is affected using ultraviolet or visible radiation. However, other methods of curing can be used. For example, thermal curing, usually in the presence of an initiator, can be used. Alternatively, the coating can be cured by electron beam irradiation where no catalyst is required. More than one coating can be applied. Typically, a first coating is applied and cured followed by a second coating and so on until the desired number of coatings have been applied. Alternatively, the layers can be applied on top of each other as liquids, typically referred to as a wet-on-wet process, with one final curing step at the end.

For example, on a bare glass fiber having a diameter of about 125 $\mu$m, a UV-curable inner primary coating can be provided, such that the fiber with inner primary coating has a diameter of about 180 $\mu$m. Then, the coating composition according to the invention can be applied in a thickness of between about 10 and about 150 $\mu$m, and preferably between about 20 and about 60 $\mu$m, and then cured.

Although the coating composition is suitable as an outer primary coating, it is also possible to use the compositions described herein as a single coating on the glass optical fiber. Single coatings can be made which have a sufficiently low modulus that it they minimize the microbending problems at low temperatures and which are hard and tough enough to protect the optical glass fiber.

The invention will be further explained by the following non-limiting examples.

EXAMPLE I

A coating composition was prepared by mixing the following components:

| Component: | Percent |
| --- | --- |
| Polyether urethane acrylate | 28.7 |
| Ethoxylated bisphenol-A-diacrylate | 56.0 |
| Ethoxylated nonylphenolacrylate [Photomer 4003 by Henkel] | 7.2 |
| 2,4,6-trimethylbenzoyldiphenyl-phosphine oxide [Lucirin TPO by BASF] | 0.9 |
| Hydroxycyclohexylphenylketone [Irgacure 184 by Ciga Geigy] | 1.8 |
| Thiodiethylene-bis-(3,5-di-tert-butyl-4-hydroxy) hydrocinnamate [Irganox 1035 by Ciba Geigy] | 0.4 |
| Bis(1,2,2,6,6-pentamethyl-4-piperidinal) sebacate [Tinuvin 292 by Ciba Geigy] | 0.4 |
| Titanium dioxide, rutile | 5.0 |

The polyether urethane acrylate was prepared as follows:
Toluene Diisocyanate (119.15 g; 1.3664 equivalents), commercially obtained as Mondur TD-80 Grade A from Mobay, Inc. of Pittsburgh, Pa. was combined with BHT, a preservative (0.53 g). The mixture was charged into a one liter, 4-necked round bottom flask.

The flask was equipped with a stirrer, a dry air sparge, a reflux condenser, a thermometer and a heating mantle on an automatic jack controlled by a thermostat. The mixture was held at 26° C. (78.8° F.) and 2-hydroxyethyl acrylate (HEA) 84.94 grams; 0.7315 equivalents) was added to the flask containing the mixture over a two (2) hour and twenty (20) minute period.

The mixture was maintained at 26.6° C. (78.8° F. for about three (3) hours after which it was heated to 50° C. 122° F.). PTGL 1000 (277.72 g; 0.6073 g equivalents, made by Hodogaya Chemical, Japan, was added all at once to the mixture. PTGL 1000 is a copolymer of 3-methyltetrahydrofuran and tetrahydrofuran, both of which have undergone a ring opening polymerization. The PTGL 1000 is the polymerization product of about 20 percent by weight 3-methyltetrahydrofuran and about 80 percent by weight of tetrahydrofuran.

The resulting mixture was allowed to mix for five minutes. Diazabicyclooctane crystals (0.25 g), (DABCO crystals), from Air Products in Allentown, Pennsylvania, were then added to the mixture. The exothermic reaction was permitted to heat the mixture to 83° C. (181.4° F.). The contents of the flask were then held at 70° C. (158° F.) until the percent of free isocyanate in the oligomer was negligible (<0.1 percent).

The structure of the resulting oligomer is represented schematically as HEA-(-TDI-PTGL 1000-)$_{0.8}$-TDI-HEA.

EXAMPLE II

A coating composition was prepared in the same manner as Example 1. The same polyether urethane acrylate as in Example I was used in the following composition:

| Component: | Percent |
|---|---|
| Polyether urethane acrylate | 32.5 |
| Ethoxylated bisphenol-A-diacrylate | 56.0 |
| Ethoxylated nonylphenolacrylate [Photomer 4003 by Henkel] | 8.0 |
| 2,4,6-trimethylbenzoyldiphenyl-phosphine oxide [Lucirin TPO by BASF] | 1.0 |
| Hydroxycyclohexylphenylketone [Irgacure 184 by Ciba Geigy] | 2.0 |
| Thiodiethylene-bis-(3,5-di-tert-butyl-4-hydroxy) hydrocinnamate [Irganox 1035 by Ciba Geigy] | 0.5 |

Comparative Example A

A coating composition was prepared by mixing the following components:

| Component: | Percent |
|---|---|
| Polyether urethane acrylate | 49.1 |
| Epoxy acrylate | 8.6 |
| Trimethylol propane triacrylate | 7.1 |
| N-vinyl pyrrolidone | 3.9 |
| N-vinyl caprolactam | 7.9 |
| Phenothiazine (stabilizer) | 0.01 |
| 2,4,6-trimethylbenzoyldiphenyl phosphine oxide | 2.4 |
| Silicone oil [DC 193 from DOW Corning] | 0.2 |
| 2-hydroxyethylacrylate | 0.8 |
| Titanium dioxide, rutile | 20.0 |

The polyether urethane acrylate was the reaction product of a stoichiometric proportion of 2-hydroxyethyl acrylate with an isocyanate-terminated oligomer, which is the urethane reaction product of polyoxytetramethylene glycol of a molecular weight 650 with toluene diisocyanate. The product had a NCO-content of 7.5% by weight. The isocyanate-terminated product used had a viscosity at 30° C. of 8000 centipoises.

The epoxy acrylate was the diacrylate of Epon 828 (Shell) which is a diglycidyl ether of bisphenol A having a molecular weight of 390.

The above mixture was sandmilled to a particle size finer than represented by a 7.5 North Standard grind gauge rating and checked by light microscopy to make sure that no particles having a size greater than 1 micron (1 micrometer) were present.

Comparative Example B

A coating composition was prepared using the following:

| Component: | Percent |
|---|---|
| Polycaprolactone urethane acrylate | 41.4 |
| Phenoxyethyl acrylate | 45.1 |
| Trimethylol propane triacrylate | 5.0 |
| 2,4,6-trimethylbenzoyldiphenyl phosphine oxide | 3.0 |
| Silicone oil [DC 203 from DOW Corning] | 0.01 |
| Titanium dioxide, rutile | 5.0 |
| Triethanol amine | 0.5 |

The above mixture was sandmilled to a particle size finer than represented by a North Standard grind gauge rating and checked by light microscopy to make sure that no particles having a size greater than 1 micron was present.

Comparative Example C

The white colored secondary coating composition from Neorad F480 (ICI) was used.

The coating compositions prepared in Examples I and II, and Comparative examples A–C, were applied as a 3 mil film on a glass plate and cured by passing beneath a single fusion "D" lamp at 1.0 J/cm2 in a nitrogen atmosphere. The properties of the cured films were measured according to the test procedures provided below. The results are shown in Table 1.

TABLE 1

Properties of coating compositions

| | Exp. I | Exp. II | Comp. Exp. A | Comp. Exp. B | Comp. Exp. C |
|---|---|---|---|---|---|
| Film thickness ($\mu$) | 150 | 75 | 75 | 150 | 150 |
| clarity | opaque | clear | opaque | opaque | opaque |
| color | white | clear | white | white | white |
| viscosity (mPa · s) | 5390 | 6200 | 24,250 | 2550 | 12,850 |
| 95% cure (J/cm$^2$) | 1.4 | 0.2 | 6 | 0.3 | 0.7 |
| tensile (MPa) | 18 | 24 | — | 20 | 36 |
| elongation (%) | 7 | 18 | — | 27 | 22 |
| modulus (MPa) | 500 | 560 | — | 670 | 1100 |
| $T_{E'-1000}$ (°C.) | 17 | 20 | 24 | 31 | 46 |
| $T_{E'-100}$ (°C.) | 47 | 52 | 77 | 43 | 76 |
| tan delta max | 49 | 53 | 78 | 45 | >8 |

TABLE 1-continued

Properties of coating compositions

|  | Exp. I | Exp. II | Comp. Exp. A | Comp. Exp. B | Comp. Exp. C |
|---|---|---|---|---|---|
| (°C.) |  |  |  |  |  |
| $E_o$ (MPa) after aging: | 22 | 26 | 33 | 11 | 13 |
| $T_{E'-1000}$ (°C.) | 22 | 22 | 19 | 38 | 61 |
| $T_{E'-100}$ (°C.) | 51 | 53 | 75 | 49 | 89 |
| tan delta max (°C.) | 52 | 56 | 74 | 51 | 94 |
| $E_o$ (MPa), (increase, %) | 23 (+5%) | 24 (−8%) | 25 (−24%) | 7 (−36%) | 9 (−31%) |
| Color | white | clear | yellowed | white | yellowed |
| Peak water absorption (%) | 1.1 | 1.2 | 3.2 | 2.1 | 6.6 |
| Water soak Extraction (%) | 1.4 | 0.8 | 1.7 | 0.6 | 3.8 |
| Total water sensitivity (%) | 2.5 | 2.0 | 4.9 | 2.7 | 10.4 |

From Table 1, it is clear that the coating compositions of Examples I and II, according to the invention, produced cured coatings having a better peak water absorption than the coatings produced from the coating compositions of Comparative Examples A, B and C. The coatings produced using the coating compositions according to the invention also exhibited an enhanced stability in the aging test. In particular, the modulus increased only 5% in Example I and decreased only 8% in Example II. In contrast, the comparative coatings decreased from 24% to 36%. Moreover, the color of the coatings of Examples I and II is unchanged after aging. Furthermore, the coatings of Examples I and II exhibited a good resistance against attack from hydrocarbon gel.

Test Procedures

The water soak extraction and absorption were measured using the following procedure. A drawdown of each material to be tested was made at a film thickness as indicated in Table 1 on a glass plate and cured. The cured film was cut to form three sample specimens, approximately 3 cm×3 cm on the glass plate. The glass plate containing the three sample specimens was heated at 80° C. for one hour and then placed in a desiccator for 15 minutes. The relative humidity and temperature of the desiccator were measured.

125 ml (4 oz.) of deionized or distilled water was poured into three 125 ml (4 oz.) glass jars, maintained at a temperature of 23±2° C. Each of the sample specimens were removed from the glass plate and weighed on an analytical balance using corrugated Teflon paper to prevent sticking. Each sample specimen was then placed into one the jars of water.

The sample specimens were soaked in the water for 30 minutes and then removed from the glass jars.

The water remaining on the surface of the sample specimens was removed by blotting them with lint free wiping tissue.

The samples were reweighed as above and placed back into their respective jars.

The above procedure was repeated at 1, 2, 3, and 24 hours, and at 7 and 14 days.

At 21 days, the sample specimens were removed from the glass jars and reweighed as above. The sample specimens were placed onto a glass plate and heated at 80° C. for one hour, and then placed in a desiccator for 15 minutes. The relative humidity and temperature of the desiccator were measured. The sample specimens were reweighed as before.

The percent weight change at each time interval for each sample specimen was determined. The values for the three sample specimens at each time interval were averaged. The water absorption reported is the largest, positive average percent weight change.

The water extraction for each sample specimen was determined by dividing the difference of the initial and 21-day dried weights by the initial dried weight and multiplying by 100. The reported value is the average of the three sample specimen values.

The total water sensitivity is the sum of the absolute values of the water absorption and the water extraction.

The elastic modulus (E'), the viscous 'module were measured using a Rheometrics Solids Analyzer (RSA-11), equipped with: 1) A personal computer having MS-DOS 5.0 or later operating system and having Rhios® software (Version 4.2.2 or later) loaded; 2) A liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. to about −70° C. and increasing the temperature at about 1°/minute until the temperature reached about 60° C. to about 70° C. The test frequency used was 1.0 radian/second.

The tensile strength of cured samples was tested using a universal testing instrument, Instron Model 4201 equipped with a personal computer and software "Series IX Materials Testing System." The cells were loaded at a 2 and 20 pound capacity. The ASTM D638M was followed, with the following modifications.

A drawdown of each material to be tested was made on a glass plate and cured using a UV processor. The cured film was conditioned at 23±2° C. and 50±5% relative humidity for a minimum of sixteen hours prior to testing.

A minimum of eight test specimens, having a width of 0.5±0.002 inches and a length of 5 inches, were cut from the cured film. If the cured film was tacky to the touch, a small amount of talc was applied to the film surface using a cotton tipped applicator.

While the invention has been described in detail and with reference to specific embodiments thereof, it will be apparent to one of ordinary skill in the art that various changes and modifications can be made therein without departing from the spirit and scope thereof.

What is claimed is:

1. A radiation-curable, glass optical fiber outer primary coating composition comprising as premixture components, the combination of:
about 20 to about 40% by weight of a polyether urethane oligomer comprising ethylenically unsaturated groups;
from about 5 to about 20% by weight of a reactive diluent;
from 0 to about 40% by weight of a photoinitiator;
from 0 to about 10% by weight of a pigment; and
about 40 to about 80% by weight of a radiation-curable oligomer represented by the following formula:

$$R^1\text{-}L^1\text{-}C^1\text{-}L^2\text{-}R^2 \qquad (1)$$

where:
$R^1$ and $R^2$, independently, each represent a radiation-curable ethylenically unsaturated functional group;
$L^1$ and $L^2$, independently, each represent an alkyleneoxy chain having from about 2 to about 40 carbon atoms, wherein $L^1$ and $L^2$ are linked to $C^1$ through an oxygen atom;
$C^1$ comprises a hydrocarbon having from about 5 to about 40 carbon atoms and containing at least one cyclic group;
wherein said composition, after radiation-cure, has:
a peak water absorption of no more than 1.5%.

2. The radiation-curable, glass optical fiber coating composition according to claim 1, wherein said composition comprises:
about 1 to about 20% by weight of said photoinitiator.

3. The radiation-curable, glass optical fiber coating composition according to claim 1, wherein said composition comprises about 1 to about 10% by weight pigment.

4. A radiation-curable, glass optical fiber coating composition according to claim 1, wherein said groups $R^1$ and $R^2$, independently, contain a radiation-curable functional group selected from the group consisting of acrylate, methacrylate, styrene, vinylether, acrylamide, maleate and fumerate.

5. The radiation-curable, glass optical fiber coating composition according to claim 1, wherein said groups $R^1$ and $R^2$ are acrylate, and said polyether urethane oligomer contains at least one acrylate group.

6. The radiation-curable, glass optical fiber coating composition according to claim 1, wherein said groups $L^1$ and $L^2$, independently, are alkyleneoxy groups containing from about 1 to about 12 alkylether groups.

7. A radiation-curable, glass optical fiber coating composition according to claim 6, wherein said alkylether groups are selected from the group consisting of ethylether, propylether, and butylether.

8. The composition according to claim 1, wherein group $C^1$ is represented by the following formulae (2) or (3):

$$X^1\text{-}X^2 \qquad (2)$$
$$X^1\text{-}Y^1\text{-}X^2 \qquad (3)$$

Where:
$X^1$ and $X^2$ are each cyclic alkylene groups; and
$Y^1$ is a hydrocarbon having from about 1 to about 15 carbon atoms.

9. A radiation-curable, glass optical fiber coating composition according to claim 1, wherein the group $C^1$ is derived from a member of the group consisting of bisphenol A, saturated bisphenol A, bisphenol F, saturated bisphenol F, tricyclodecane dimethanol and cyclohexane dimethanol.

10. A radiation-curable, glass optical fiber coating composition according to claim 1, wherein said radiation-curable oligomer according to formula (1) is an ethoxylated or propoxylated bisphenol-A-diacrylate.

11. The composition according to claim 1, wherein said polyether urethene oligomer has a molecular weight between about 500 and about 2000.

12. The radiation-curable, glass optical fiber coating composition according to claim 1, wherein said composition, after radiation-cure, has:
an elongation at break of at least about 5%;
a room temperature tensile modulus of at least about 400 MPa; and
a glass transition temperature, tan delta max., of at least about 40° C.

13. The radiation-curable, glass optical fiber coating composition according to claim 1, wherein said radiation-curable oligomer according to formula 1 is an alkoxylated bisphenol di(meth)acrylate.

14. A radiation-curable, glass optical fiber coating composition comprising as pre-mixture components:
about 10 to about 80% by weight of an ethylenically unsaturated polyether urethane oligomer having a molecular weight of at least about 500 daltons;
about 10 to about 80% by weight of an alkoxylated bisphenol di(meth)acrylate;
from 0 to about 40% by weight of a reactive diluent;
from 0 to about 40% by weight of a photoinitiator; and
from 0 to about 10% by weight of a pigment,
wherein said composition, after radiation-cure, has:
an elongation at break of at least about 5%;
a peak water absorption of no more than 1.5%;
a room temperature tensile modulus of 50–560 Mpa;
a glass transition temperature, tan delta max., of at least about 40° C.;
hydrolytic stability; and
resistance to attack from hydrocarbon gel cable filling material.

15. In the formulation of radiation-curable, optical glass fiber coating compositions containing at least one radiation curable polyether urethane oligomer, the improvement comprising:
incorporating a radiation-curable oligomer according to the following formula:

$$R^1\text{-}L^1\text{-}C^1\text{-}L^2\text{-}R^2 \qquad (1)$$

where:
$R^1$ and $R^2$, independently, each represent an ethylenically unsaturated radiation-curable functional group;
$L^1$ and $L^2$, independently, each represent an alkyleneoxy chain having from about 2 to about 40 carbon atoms, wherein $L^1$ and $L^2$ are linked to $C^1$ through an oxygen atom;
$C^1$ comprises a hydrocarbon having from about 5 to about 40 carbon atoms and containing at least one cyclic group,
wherein said coating composition when suitably cured exhibits:
a peak water absorption of no more than 1.5%.

16. The formulation according to claim 15, wherein said coating composition when suitably cured exhibits:
an elongation at break of at least about 5%;

a room temperature tensile modulus of at least about 400 MPa; and a glass transition temperature, tan delta max., of at least about 40° C.

17. The formulation according to claim 15, wherein said groups $R^1$ and $R^2$, independently, contain a radiation-curable functional group selected from the group consisting of acrylate, methacrylate, styrene, vinylether, acrylamide, maleate and fumarate.

18. The formulation according to claim 15, wherein said groups $R^1$ and $R^2$ are acrylate.

* * * * *